US009613406B2

(12) United States Patent
Chen et al.

(10) Patent No.: US 9,613,406 B2
(45) Date of Patent: Apr. 4, 2017

(54) METHOD AND APPARATUS FOR PROVIDING SPECULAR SURFACE RECONSTRUCTION

(71) Applicant: Nokia Technologies Oy, Espoo (FI)

(72) Inventors: Xin Chen, Evanston, IL (US); Ruigang Yang, Lexington, KY (US)

(73) Assignee: Nokia Technologies Oy, Espoo (FI)

( * ) Notice: Subject to any disclaimer, the term of this patent is extended or adjusted under 35 U.S.C. 154(b) by 169 days.

(21) Appl. No.: 14/675,103

(22) Filed: Mar. 31, 2015

(65) Prior Publication Data

US 2016/0292830 A1 Oct. 6, 2016

(51) Int. Cl.
| | | |
|---|---|---|
| G06T 15/00 | (2011.01) | |
| G06T 5/00 | (2006.01) | |
| G06T 5/50 | (2006.01) | |
| G06T 7/00 | (2017.01) | |

(52) U.S. Cl.
CPC ............... *G06T 5/006* (2013.01); *G06T 5/50* (2013.01); *G06T 7/0057* (2013.01); *G06T 7/0073* (2013.01); *G06T 7/0085* (2013.01); *G06T 2207/10024* (2013.01); *G06T 2207/10028* (2013.01); *G06T 2207/10152* (2013.01)

(58) Field of Classification Search
CPC ...... G06T 7/0051–7/0075; G06T 2207/10028; G01S 17/89–17/895; G01N 2021/551; H04N 13/0253
See application file for complete search history.

(56) References Cited

U.S. PATENT DOCUMENTS

| | | |
|---|---|---|
| 8,441,532 B2 | 5/2013 | Potapenko |
| 2013/0301908 A1* | 11/2013 | Shim ...................... G06T 5/005 382/154 |

(Continued)

FOREIGN PATENT DOCUMENTS

| | | |
|---|---|---|
| EP | 2144448 A1 | 1/2010 |
| WO | 2013102862 A1 | 7/2013 |

(Continued)

OTHER PUBLICATIONS

Mu et al., "Complete 3D Model Reconstruction Using Two Types of Depth Sensors", IEEE International Conference on Intelligent Computing and Intelligent Systems (ICIS), 2010, 5 pages.

(Continued)

*Primary Examiner* — Brian P Werner
(74) *Attorney, Agent, or Firm* — Ditthavong & Steiner, P.C.

(57) ABSTRACT

An approach is provided for reconstruction of dynamic arbitrary specular objects. The approach involves determining time-of-flight data for at least one pixel of at least one time-of-flight sensor configured with at least one retro-reflector, wherein the time-of-flight data includes a first distance from the at least one time-of-flight sensor to at least one point of at least one surface, and a second distance from the at least one point to the at least one retro-reflector. The approach also involves determining other time-of-flight data for one or more neighboring pixels which are neighboring the at least one pixel. The approach further involves determining at least one range distance to the at least one point of the at least one surface by causing, at least in part, a factoring out of the second distance from the time-of-flight data by using the other time-of-flight data. The approach also involves causing, at least in part, a reconstruction of the at least one surface using the at least one range distance.

20 Claims, 12 Drawing Sheets

(56) References Cited

U.S. PATENT DOCUMENTS

| | | |
|---|---|---|
| 2014/0268160 A1 | 9/2014 | Debevec et al. |
| 2015/0042768 A1* | 2/2015 | Meinherz ............... G01B 11/22 348/49 |
| 2016/0154102 A1* | 6/2016 | Furxhi .................... G01S 13/89 342/59 |

FOREIGN PATENT DOCUMENTS

| | | |
|---|---|---|
| WO | 2013168996 A1 | 11/2013 |
| WO | 2013186107 A1 | 12/2013 |

OTHER PUBLICATIONS

Roth et al., "Specular Flow and the Recovery of Surface Structure", IEEE Computer Society Conference on Computer Vision and Pattern Recognition, 2006, 8 pages.

Yang et al., "Dealing with Textureless Regions and Specular Highlights—A Progressive Space Carving Scheme Using a Novel Photoconsistency Measure", Ninth IEEE International Conference on Computer Vision, 2003, vol. 1,, 9 pages.

Sankaranarayana et al., "Specular Surface Reconstruction from Sparse Reflection Correspondences", IEEE Conference on Computer Vision and Pattern Recognition (CVPR), 2010, 8 pages.

\* cited by examiner

METHOD AND APPARATUS FOR PROVIDING SPECULAR SURFACE RECONSTRUCTION

BACKGROUND

In recent years, there has been rapid development in digital imaging technology. However, the difficulty in measuring the specular surfaces still remains a challenging problem. The specular surfaces exhibit complex reflectance behavior, and emit distorted reflection of the surrounding environment. Such specular reflection contradicts the operation of conventional sensors (e.g., time-of-flight sensors) based on diffuse components of reflection.

SOME EXAMPLE EMBODIMENTS

Therefore, there is a need for an approach for reconstruction of dynamic arbitrary specular objects to acquire accurate geometry.

According to one embodiment, a method comprises determining time-of-flight data for at least one pixel of at least one time-of-flight sensor configured with at least one retro-reflector, wherein the time-of-flight data includes a first distance from the at least one time-of-flight sensor to at least one point of at least one surface, and a second distance from the at least one point to the at least one retro-reflector. The method also comprises determining other time-of-flight data for one or more neighboring pixels which are neighboring the at least one pixel. The method further comprises determining at least one range distance to the at least one point of the at least one surface by causing, at least in part, a factoring out of the second distance from the time-of-flight data by using the other time-of-flight data. The method also comprises causing, at least in part, a reconstruction of the at least one surface using the at least one range distance.

According to another embodiment, an apparatus comprises at least one processor, and at least one memory including computer program code for one or more computer programs, the at least one memory and the computer program code configured to, with the at least one processor, cause, at least in part, the apparatus to determine time-of-flight data for at least one pixel of at least one time-of-flight sensor configured with at least one retro-reflector, wherein the time-of-flight data includes a first distance from the at least one time-of-flight sensor to at least one point of at least one surface, and a second distance from the at least one point to the at least one retro-reflector. The apparatus is also caused to determine other time-of-flight data for one or more neighboring pixels which are neighboring the at least one pixel. The apparatus is further caused to determine at least one range distance to the at least one point of the at least one surface by causing, at least in part, a factoring out of the second distance from the time-of-flight data by using the other time-of-flight data. The apparatus is also caused to cause, at least in part, a reconstruction of the at least one surface using the at least one range distance.

According to another embodiment, a computer-readable storage medium carries one or more sequences of one or more instructions which, when executed by one or more processors, cause, at least in part, an apparatus to determine time-of-flight data for at least one pixel of at least one time-of-flight sensor configured with at least one retro-reflector, wherein the time-of-flight data includes a first distance from the at least one time-of-flight sensor to at least one point of at least one surface, and a second distance from the at least one point to the at least one retro-reflector. The apparatus is also caused to determine other time-of-flight data for one or more neighboring pixels which are neighboring the at least one pixel. The apparatus is further caused to determine at least one range distance to the at least one point of the at least one surface by causing, at least in part, a factoring out of the second distance from the time-of-flight data by using the other time-of-flight data. The apparatus is also caused to cause, at least in part, a reconstruction of the at least one surface using the at least one range distance.

According to another embodiment, an apparatus comprises means for determining time-of-flight data for at least one pixel of at least one time-of-flight sensor configured with at least one retro-reflector, wherein the time-of-flight data includes a first distance from the at least one time-of-flight sensor to at least one point of at least one surface, and a second distance from the at least one point to the at least one retro-reflector. The apparatus also comprises means for determining other time-of-flight data for one or more neighboring pixels which are neighboring the at least one pixel. The apparatus further comprises means for determining at least one range distance to the at least one point of the at least one surface by causing, at least in part, a factoring out of the second distance from the time-of-flight data by using the other time-of-flight data. The apparatus also comprises means for causing, at least in part, a reconstruction of the at least one surface using the at least one range distance.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for reconstructing dynamic arbitrary specular objects are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
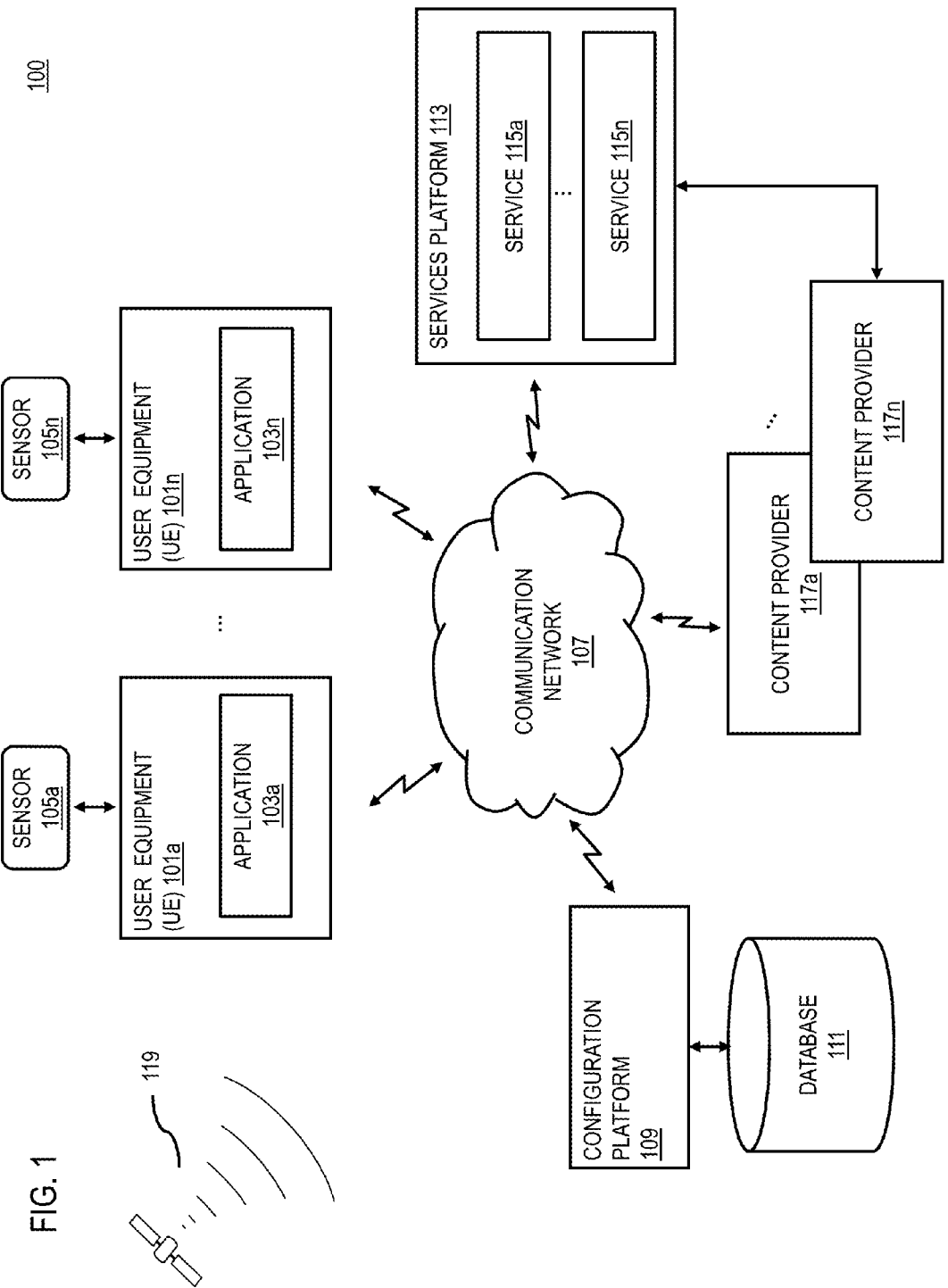
FIG. 1 is a diagram of a system capable of reconstructing dynamic arbitrary specular objects, according to one embodiment.

FIG. 1 is a diagram of a system capable of reconstructing dynamic arbitrary specular objects, according to one embodiment. In one example embodiment, the time-of-flight (ToF) sensors generate a light source into the environment, and then the environment reflects the light that goes back to the sensors. The ToF sensor observes the reflected light, measures the phase shift between the illumination and the reflection, and translates it to distance. The ToF sensors are radar sensors and near infrared spectroscopy sensors that measure the travel time for light transmitted from the ToF sensors to at least one object (e.g., building surfaces), and the objects reflecting the light back to the ToF sensor. However, in case of specular or mirror surface, the light is reflected beyond the field of view of the ToF sensor unless its normal is aligned with the incident direction. In one scenario, specular surfaces are very difficult to reconstruct because they reflect lights in a non-uniform manner. The existing ToF sensors are not effective for specular surfaces because the light generated from the ToF sensors is reflected by the specular surface in a different direction. In such circumstances, the reading becomes invalid.

To address this problem, a system 100 of FIG. 1 introduces the capability to reflect light from specular surfaces back to the field of view of ToF sensors by adding retro reflectors on ToF sensors. For example, a specular surface may reflect light in different directions, the retro-reflectors may reflect the light back to the ToF sensor because it has the optical property of reflecting the light back to the incident direction. As a result, retroreflectors may be positioned behind or in surrounding areas of the ToF sensors, whereupon the retro reflector returns an oncoming beam of light back to its source with a minimum of scattering. However, the reported distance by the ToF sensor includes the distance from the ToF sensor to the specular surface as well as the distance from the specular surface to the retro-reflector. Since, it is difficult to factor out the total flight time, system 100 provides a solution to this problem.

In one embodiment, the range of a pixel is denoted at (i) as D(i). The corresponding 3D point is denoted as P, and its four neighbors are $P_0$, $P_1$, $P_2$, and $P_3$, as shown below:

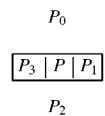

Using finite difference, P's normal N can be calculated as $$\vec{N_0} = \overrightarrow{P_0 - P} \times \overrightarrow{P_1 - P},$$

$$\vec{N_1} = \overrightarrow{P_1 - P} \times \overrightarrow{P_2 - P},$$

$$\vec{N_2} = \overrightarrow{P_2 - P} \times \overrightarrow{P_3 - P},$$

$$\vec{N_3} = \overrightarrow{P_3 - P} \times \overrightarrow{P_0 - P},$$

$$\vec{N} = \frac{1}{4}\sum_{i=0}^{3}\vec{N}_i.$$

Therefore the reflection vector can be calculated as:

$$\vec{R} = \overrightarrow{P-O} \cdot (\vec{N}\cdot\vec{N}) - 2\vec{N} - (\overrightarrow{P-O}\cdot\vec{N})$$

Where O is the origin of the camera. There is an assumption that the shape and the location of the reflector is known. For simplicity, the reflector is assumed to be a planar surface located on the same plane as the image plane with a surface normal of $\vec{N}_p$, then the distance between P and the reflected light hitting the reflection plane is:

$$R_d = \frac{\overrightarrow{P-O}\cdot\overrightarrow{N_P}}{\vec{R}.\overrightarrow{N_P}}$$

The total distance the light has travelled is:

$$D = D(i) + R_d \cdot \|\vec{R}\|_2$$

Assume $D_o$ as the measured distance from the ToF sensor:

$$D(i) = D_o - R_d \cdot \|\vec{R}\|_2$$

In the above equation, there are five unknowns (D(i) and the range of its neighboring pixels $D(i)_0, D(i)_1, D(i)_2, D(i)_3$). To solve all the D(i) by stacking all the equations for all pixels, special care needs to be taken at the boundaries in which there are no four neighbors for boundary pixels. In this example embodiment, instead of using the average of its four neighbors, just the average of its available neighboring pixels is used.

As shown in FIG. 1, the system 100 comprises user equipment (UEs) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the configuration platform 109 via the communication network 107.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

By way of example, the applications 103 may be any type of application that is executable at the UE 101, such as camera/imaging application, location-based service applications, navigation applications, mapping application, content provisioning services, media player applications, social networking applications, calendar applications, and the like. In one embodiment, one of the applications 103 at the UE 101 may act as a client for the configuration platform 109 and perform one or more functions associated with the functions of the configuration platform 109 by interacting with the configuration platform 109 over the communication network 107.

By way of example, the sensors 105 may be any type of sensor. In one embodiment, the sensors 105 may include, for example, a ToF sensor to compute the depth for each individual pixel based on the time difference between the time an infra-red light signal was emitted towards the object, and the time at which it was reflected back to the ToF sensor. In another embodiment, the sensors 105 may include a retro-reflector that returns an oncoming beam of light back to its source. In certain embodiments, the sensors 105 may include, for example, a camera/imaging sensor for gathering image data, an audio recorder for gathering audio data, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, and the like. In one example embodiment, the UE 101 may include GPS receivers to obtain geographic coordinates from satellites 119 for determining current location and time associated with the UE 101.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the configuration platform 109 may be a platform with multiple interconnected components for capturing dynamically changing specular surfaces. The configuration platform 109 may include multiple servers, intelligent networking devices, computing devices, components and corresponding software for reconstructing dynamic arbitrary specular objects. In addition, it is noted that the configuration platform 109 may be a separate entity of the system 100, a part of the one or more services 115a-115n (collectively referred to as services 115) of the services platform 113, or included within the UE 101 (e.g., as part of the applications 103).

In one embodiment, the configuration platform 109 may determine time-of-flight data for at least one pixel of at least one time-of-flight sensor configured with at least one retro-reflector. In one scenario, the configuration platform 109 may use one or more ToF sensors and retro-reflectors to measure dynamic arbitrary specular shapes. Since, specular surface reflects the light beyond the field of view of the ToF sensor, adding a retro-reflector reflects the light back to the ToF sensor. In one embodiment, the ToF data includes a first distance from a ToF sensor to at least one point of a specular surface, and a second distance from the at least one point of a specular surface to the retro-reflector. Then, the configuration platform 109 may determine other time-of-flight data for one or more neighboring pixels which are neighboring the at least one pixel. In one scenario, each pixel on the sensor samples the amount of light reflected at equal intervals for every period which allows for the parallel measurement. Subsequently, the configuration platform 109 may determine at least one range distance to the at least one point of the at least one specular surface by causing, at least in part, a factoring out of the second distance from the time-of-flight data by using the other time-of-flight data. Then, the configuration platform 109 may cause, at least in part, a reconstruction of the at least one specular surface using the at least one range distance.

In one embodiment, the database 111 may store information on specular and/or non-specular (e.g., diffuse) surfaces for one or more objects, distance information to one or more specular and/or diffuse objects, depth information for one or more specular and/or diffuse objects, etc. The information may be any multiple types of information that can provide means for aiding in the content provisioning and sharing process.

The services platform 113 may include any type of service. By way of example, the services platform 113 may include content (e.g., audio, video, images, etc.) provisioning services, application services, storage services, mapping services, navigation services, contextual information determination services, location based services, information (e.g., weather, news, etc.) based services, etc. In one embodiment, the services platform 113 may interact with the UE 101, the configuration platform 109 and the content provider 117 to supplement or aid in the processing of the content information.

By way of example, the services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability.

The content provider 117 may provide content to the UE 101, the configuration platform 109, and the services 115 of the services platform 113. The content provided may be any type of content, such as image content, textual content, audio content, video content, etc. In one embodiment, the content provider 117 may provide content that may supplement content of the applications 103, the sensors 105, or a combination thereof. By way of example, the content provider 117 may provide content that may aid in the calculation of the distance information for one or more specular surfaces. In one embodiment, the content provider 117 may also store content associated with the UE 101, the configuration platform 109, and the services 115 of the services platform 113. In another embodiment, the content provider 117 may manage access to a central repository of data, and offer a consistent, standard interface to data, such as a repository for information on specular and/or non-specular surfaces for one or more objects, distance information to one or more specular and/or diffuse objects, depth information for one or more specular and/or diffuse objects, etc. Any known or still developing methods, techniques or processes for generating, retrieving and/or accessing distance information for specular surfaces may be employed by the configuration platform 109.

By way of example, the UE 101, the configuration platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
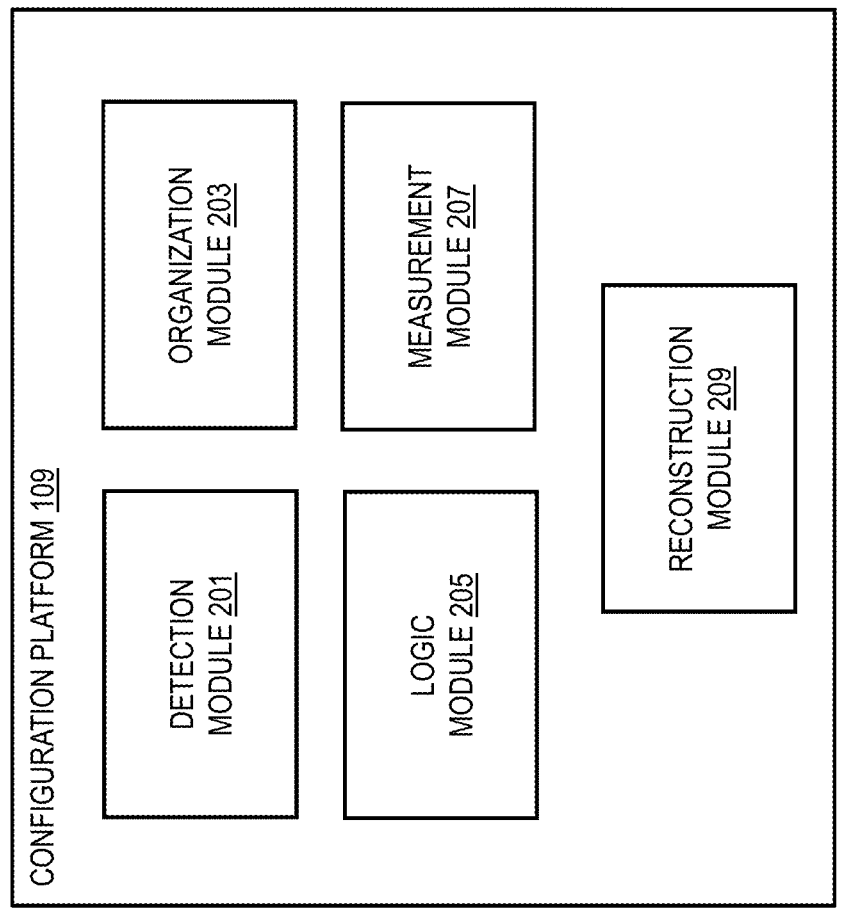
FIG. 2 is a diagram of the components of the configuration platform 109, according to one embodiment.

FIG. 2 is a diagram of the components of the configuration platform 109, according to one embodiment. By way of example, the configuration platform 109 includes one or more components for providing reconstruction of dynamic arbitrary specular objects. It is contemplated that the functions of these components may be combined in one or more components or performed by other components of equivalent functionality. In this embodiment, the configuration platform 109 includes a detection module 201, an organization module 203, a logic module 205, a measurement module 207, and a reconstruction module 209.

In one embodiment, the detection module 201 may detect specular and non-specular (e.g., diffuse) surfaces for one or more objects. In another embodiment, the detection module 201 may detect lights reflected from a specular surface and a diffuse surface. The detection module 201 may alert the organization module 203 that at least one object has specular surface because specular surfaces reflects lights beyond the field of view of the ToF sensors.

In one embodiment, the organization module 203 may synchronize ToF sensor and the retro-reflectors for capturing one or more ToF data for the at least one specular surface. A retro-reflector reflects the light back to the ToF sensors because it has the optical property of reflecting lights back to the incident direction. In another embodiment, the organization module 203 may co-ordinate the movement of the ToF sensor configured with the retro-reflectors to capture one or more ToF data from specular surfaces. In a further embodiment, the organization module 203 may co-ordinate the movement a ToF sensor without a retro-reflector to capture one or more ToF data from diffuse surfaces.

In one scenario, the ToF data includes distance from the ToF sensor to at least one point of a specular surface, and distance from the at least one point of a specular surface to the at least one retro-reflector. In one embodiment, the logic module 205 may determine range distance by factoring out the distance from the point of a specular surface to the at least one retro-reflector. The distance may be factored out based, at least in part, on the available number of the neighboring pixels. In one scenario, each neighboring pixels provide depth information of the corresponding point in an object.

In one embodiment, the measurement module 207 may calculate the time of flight at each pixel location based on which the range of object can be directly calculated. In another embodiment, the measurement module 207 may compute the travel time for lights emitted from the light source (e.g., ToF sensor) and reflected off from the surface of an object back to the light source to determine the distance of the object.

In one embodiment, the reconstruction module 209 may reconstruct a specular surface using the range distance determined by the logic module 205.

The above presented modules and components of the configuration platform 109 can be implemented in hardware, firmware, software, or a combination thereof. Though depicted as a separate entity in FIG. 1, it is contemplated that the configuration platform 109 may be implemented for direct operation by respective UE 101. As such, the configuration platform 109 may generate direct signal inputs by way of the operating system of the UE 101 for interacting with the applications 103. In another embodiment, one or more of the modules 201-207 may be implemented for operation by respective UEs, as a configuration platform 109, or combination thereof. Still further, the configuration platform 109 may be integrated for direct operation with the services 115, such as in the form of a widget or applet, in accordance with an information and/or subscriber sharing arrangement. The various executions presented herein contemplate any and all arrangements and models.

Figure 3:
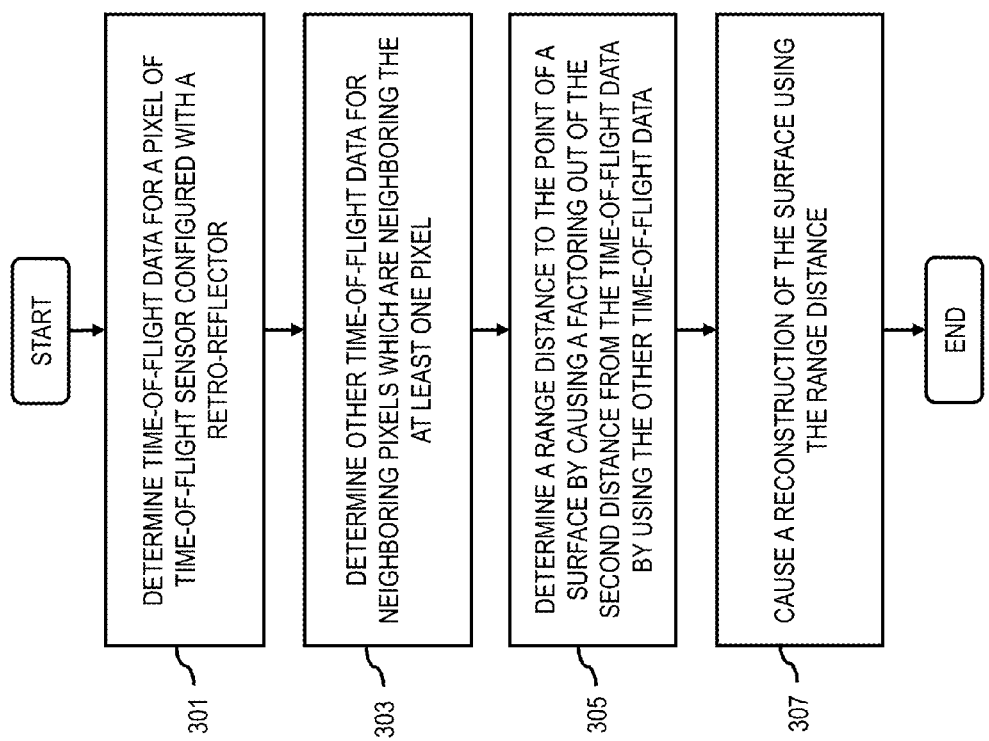
FIG. 3 is a flowchart of a process for reconstructing a surface by using range distance, according to one embodiment.
Figure 11:
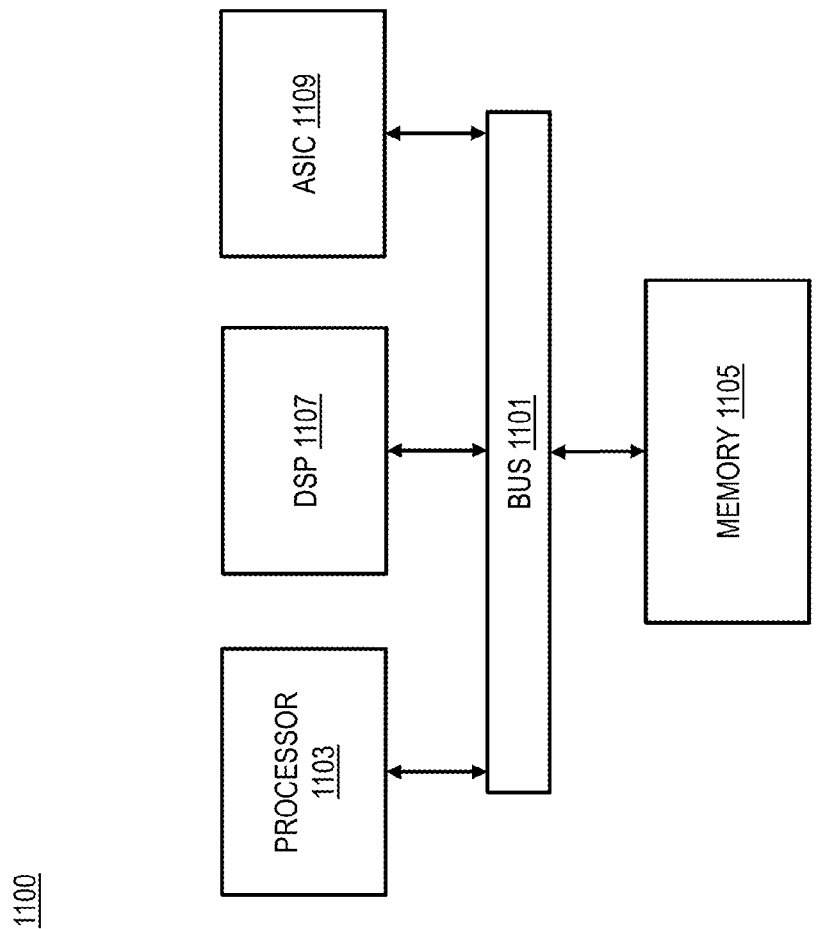
FIG. 11 is a diagram of a chip set that can be used to implement an embodiment of the invention.

FIG. 3 is a flowchart of a process for reconstructing a surface by using range distance, according to one embodiment. In one embodiment, the configuration platform 109 performs the process 300 and is implemented in, for instance, a chip set including a processor and a memory as shown in FIG. 11.

In step 301, the configuration platform 109 may determine time-of-flight data for at least one pixel of at least one time-of-flight sensor configured with at least one retro-reflector, wherein the time-of-flight data includes a first distance from the at least one time-of-flight sensor to at least one point of at least one surface, and a second distance from the at least one point to the at least one retro-reflector. In one embodiment, the minimum number of the one or more neighboring pixels is at least four. In another embodiment, the at least one retro-reflector is a planar surface, a semi-spherical surface, a parabolic surface, or a combination thereof. In one scenario, to capture more specular reflections off the object a hemisphere shaped retro-reflector may be used. The ToF sensor may be placed in the center top of a parabolic retro-reflector surface to ensure reflection of light back to its source.

In step 303, the configuration platform 109 may determine other time-of-flight data for one or more neighboring pixels which are neighboring the at least one pixel. In one scenario, the reported distance by a ToF sensor configured to a retro-reflector comprises of distance from the ToF sensor to the specular surface, and the distance from the specular surface to the retro-reflector (as discussed in FIG. 9). The configuration platform 109 needs to factor out the latter distance by determining the distance information from the neighboring pixels. The steps are well enumerated in paragraphs 30-36.

In step 305, the configuration platform 109 may determine at least one range distance to the at least one point of the at least one surface by causing, at least in part, a factoring out of the second distance from the time-of-flight data by using the other time-of-flight data.

In step 307, the configuration platform 109 may cause, at least in part, a reconstruction of the at least one surface using the at least one range distance. In one scenario, the configuration platform 109 may reconstruct a specular surface by imaging a specularly reflective surface with a pattern of light.

Figure 4:
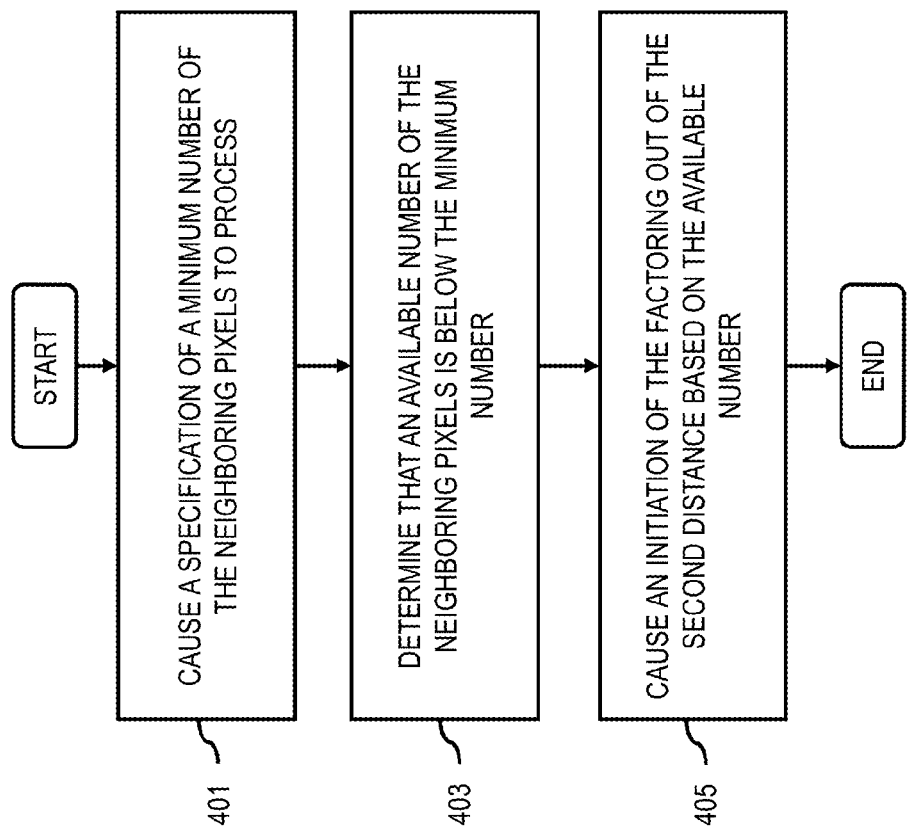
FIG. 4 is a flowchart of a process for factoring out second distance from a point on a specular surface to a retro-reflector based on the available numbers of neighboring pixels, according to one embodiment.

FIG. 4 is a flowchart of a process for factoring out second distance from a point on a specular surface to a retro-reflector based on the available numbers of neighboring pixels, according to one embodiment. In one embodiment, the configuration platform 109 performs the process 400 and is implemented in, for instance, a chip set including a processor and a memory as shown in FIG. 11.

In step 401, the configuration platform 109 may cause, at least in part, a specification of a minimum number of the one or more neighboring pixels to process. In one scenario, the configuration platform 109 may detect specular reflection. The configuration platform 109 may find empty spots in ToF depth image reading, since specular surface bounces the light off to other directions thereby leading holes in the depth image reading. Then, the configuration platform 109 may use the retro-reflector to reflect the light back to the incident direction. Subsequently, the configuration platform 109 may determine the specification (e.g., range) of the neighboring or adjacent pixels to factor out the second distance from the ToF data.

In step 403, the configuration platform 109 may determine that an available number of the one or more neighboring pixels are below the minimum number. In one scenario, a ToF sensor measures the time of flight at each pixel location to directly calculate the range of object. In the case of specular or mirror surface, the light is reflected beyond the field of view of the ToF sensor hence the range of the neighboring pixels needs to be calculated. In one scenario, if the available number of the neighboring pixels is below four, the configuration platform 109 may use the average of its available neighboring pixels.

In step 405, the configuration platform 109 may cause, at least in part, an initiation of the factoring out of the second distance based, at least in part, on the available number. In one scenario, the configuration platform 109 may use the average of the four neighbors if available, if not, the configuration platform 109 uses the average of available neighboring pixels. Then, the configuration platform 109 may factor out the second distance.

Figure 5:
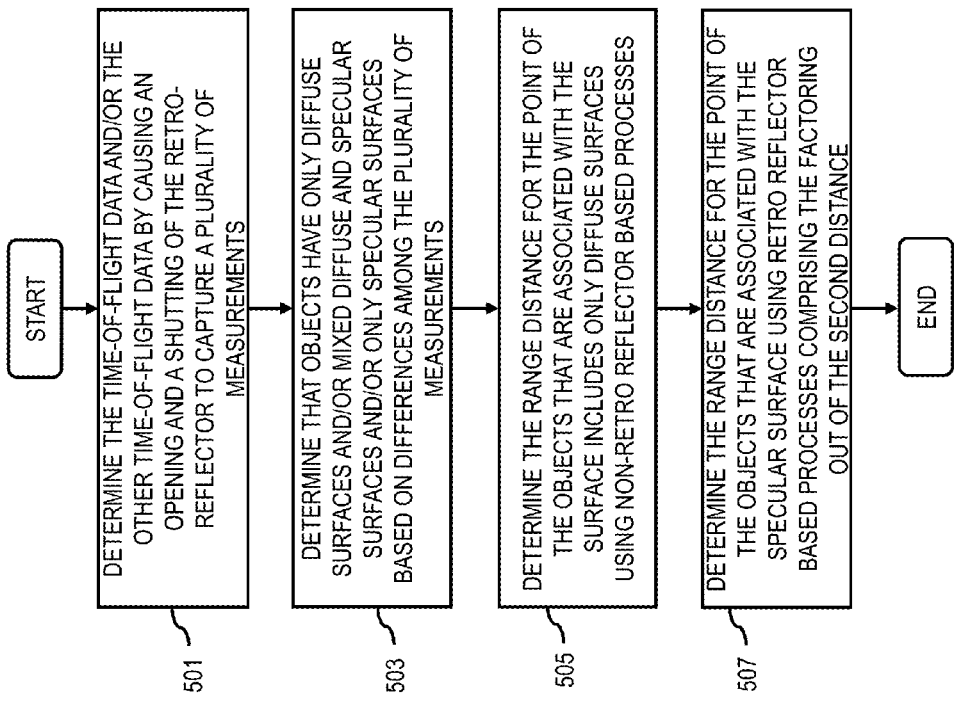
FIG. 5 is a flowchart of a process for determining range distance for objects with diffuse and/or specular surfaces, according to one embodiment.

FIG. 5 is a flowchart of a process for determining range distance for objects with diffuse and/or specular surfaces, according to one embodiment. In one embodiment, the configuration platform 109 performs the process 500 and is implemented in, for instance, a chip set including a processor and a memory as shown in FIG. 11.

In step 501, the configuration platform 109 may determine the time-of-flight data, the other time-of-flight data, or a combination thereof by causing, at least in part, an opening and a shutting of the at least one retro-reflector to capture a plurality of measurements.

In step 503, the configuration platform 109 may determine that one or more objects have only diffuse surfaces, mixed diffuse and specular surfaces, only specular surfaces, or a combination thereof based, at least in part, on one or more differences among the plurality of measurements. In one scenario, the configuration platform 109 may determine that there are objects with mixed surface materials (i.e., both diffusion and specular). Then, the configuration platform 109 may make the retro-reflector open and shut quickly to capture multiple (e.g., two) measurements. In one scenario, if there is no difference between the two measurements, the configuration platform 109 may determine that only diffusion reflection exits. However, if the open measurement yields more measured points, the configuration platform 109 may determine that mixed objects exist. Then, traditional ToF calculation may be used to compute the shut measurement and the semi-sphere shaped retro-reflector may be used with the ToF sensor to compute the distance of the additional points.

In step 505, the configuration platform 109 may determine the at least one range distance for the at least one point of the one or more objects that are associated with the at least one surface that includes the only diffuse surfaces using non-retro reflector based processes. In one scenario, a diffuse surface may reflect light into all directions. In one example embodiment, most everyday objects exhibit diffuse reflection because of the tiny imperfections on the surface. In diffuse reflection, each individual ray strikes a part of the surface that is oriented in a different direction. Since, diffuse surfaces can reflect the light back to the ToF sensor, the ToF sensor may calculate the distance and/or the depth of the diffuse surface without any configuration with the retro-reflectors.

In step 507, the configuration platform 109 may determine the at least one range distance for the at least one point of the one or more objects that are associated with the at least one specular surface that includes the mixed diffuse and specular surfaces, the only specular surfaces, or a combination thereof using retro reflector based processes comprising the factoring out of the second distance. In one scenario, adding retro-reflectors to the ToF sensors may calculate depth and/or distance and/or lateral resolution for specular objects in real-time for precise 3D reconstruction of specular objects. As discussed, the ToF data includes distance from ToF sensors towards specular surface as well as distance from the specular surface to the retro-reflector. The configuration platform 109 may factor out the distance from the specular surface to the retro-reflector based, at least in part, on the number of adjacent or nearby pixels.

Figure 6:
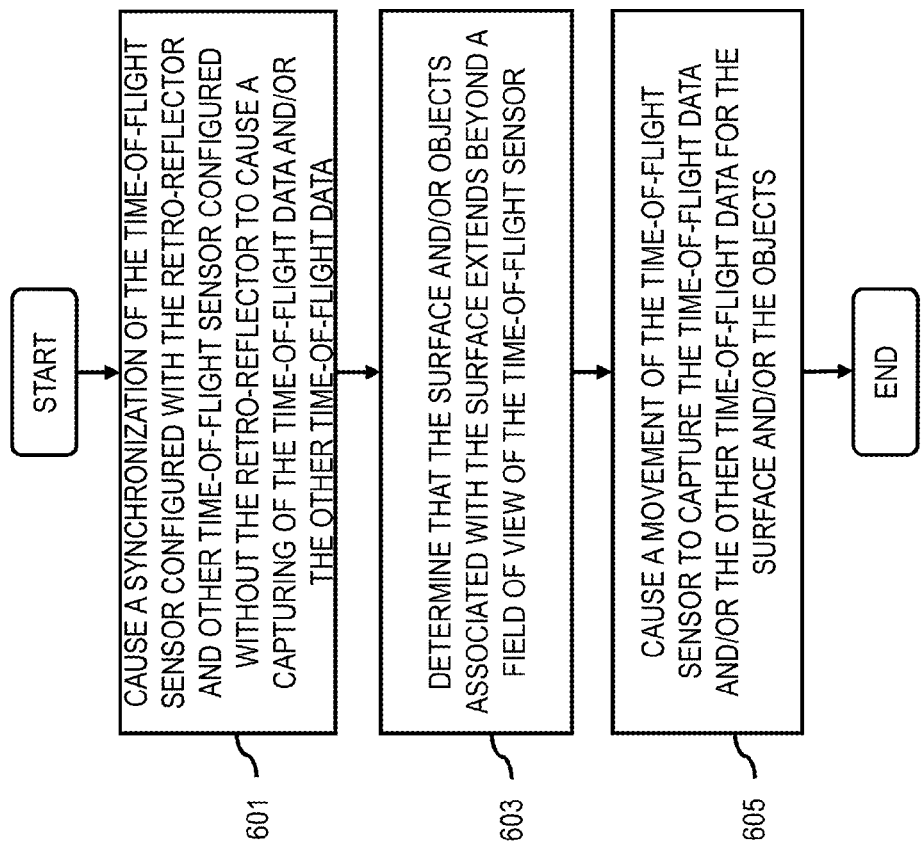
FIG. 6 is a flowchart of a process for synchronization and movement of time-of-flight sensor to capture time-of-flight data and/or the other time-of-flight data for dynamic objects and/or specular surfaces, according to one embodiment.

FIG. 6 is a flowchart of a process for synchronization and movement of time-of-flight sensor to capture time-of-flight data and/or the other time-of-flight data for dynamic objects and/or specular surfaces, according to one embodiment. In one embodiment, the configuration platform 109 performs the process 600 and is implemented in, for instance, a chip set including a processor and a memory as shown in FIG. 11.

In step 601, the configuration platform 109 may cause, at least in part, a synchronization of the at least one time-of-flight sensor configured with the retro-reflector and at least one other time-of-flight sensor configured without the retro-reflector to cause, at least in part, a capturing of the time-of-flight data, the other time-of-flight data, or a combination thereof for the at least one dynamic object. In one embodiment, the at least one time-of-flight sensor and the at least one other time-of-flight sensor are configured with differently modulated lasers. In one scenario, the at least one surface is associated with at least one dynamic object. The configuration platform 109 may use two synchronized sensors (one with and one without the retro-reflector) to capture the scene for dynamic objects which require instant capture. Then, the configuration platform 109 may compare the difference and distance to determine diffusion reflection and/or specular reflection. In another scenario, the configuration platform 109 may minimize the interference from the two sensors by using differently modulated lasers.

In step 603, the configuration platform 109 may determine that at least one surface, one or more objects associated with the at least one surface, or a combination thereof extends beyond a field of view of the at least one time-of-flight sensor. In one scenario, specular surfaces emit mirror-like reflection at a specific angle. The specular surfaces reflects a light in an angle that is the same as that of the incident ray (i.e., the angle of incidence is equal to the angle of reflection). Such light reflected by the specular surface is beyond the field of view of the ToF sensor unless its normal is aligned with the incident direction.

In step 605, the configuration platform 109 may cause, at least in part, a movement of the at least one time-of-flight sensor to capture the time-of-flight data, the other time-of-flight data, or a combination thereof for the at least one surface, the one or more objects, or a combination thereof. In one scenario, a ToF sensors configured with a retro-reflector may conveniently detect small objects that are near the sensor and can be placed inside the hemisphere shaped retro-reflector. In another scenario, the ToF sensors configured with a retro-reflector may be moved around for reconstructing large areas (e.g., outside environment). In one example embodiment, at least one user may hold and move around his/her UE 101 equipped with the sensors 105 (e.g., ToF sensors and/or retro-reflectors) to reconstruct outside/indoor environment. In another example embodiment, the sensors 105 may be attached to one or more drones or airplanes to scan building facades with specular surfaces.

Figure 7:
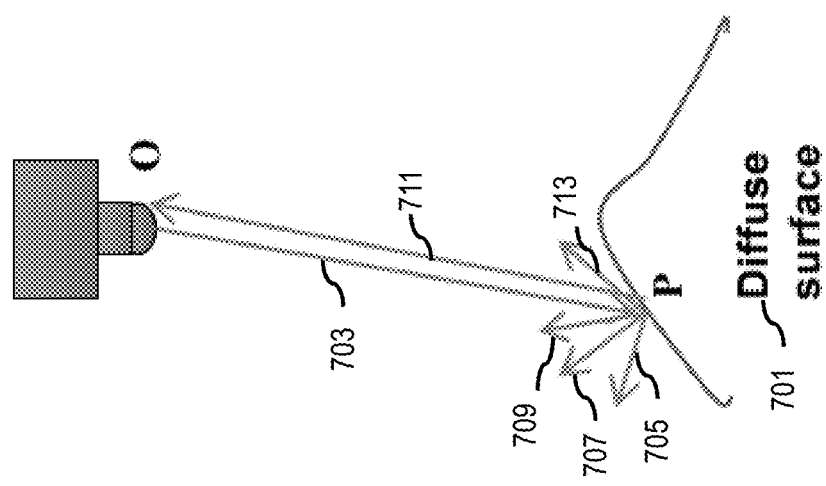
FIG. 7 represents a scenario wherein the time-of-flight (ToF) sensor performs a normal depth reading in case of a diffuse surface used in the processes of FIGS. 3-6, according to various embodiments.

FIG. 7 represents a scenario wherein the ToF sensor performs a normal depth reading in case of a diffuse surface used in the processes of FIGS. 3-6, according to various embodiments. In one scenario, a diffuse surface 701 reflects light at many angles rather than at just one angle. In one example embodiment, a ToF sensor may shoot a ray of light 703 on a diffuse surface 701. Then, the diffuse surface 701 may reflect the ray of light equally in all direction (705, 707, 709, 711, and 713). The ray of light (PO) may be reflected back to the ToF sensor. Subsequently, the ToF sensor may directly obtain the information on the depth of the diffuse surface P.

Figure 8:
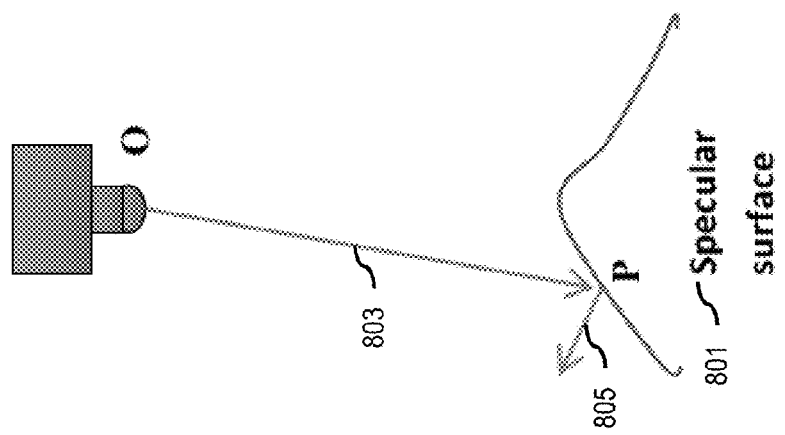
FIG. 8 represents a scenario wherein the ToF sensor performs a no depth reading in case of a specular surface used in the processes of FIGS. 3-6, according to various embodiments.

FIG. 8 represents a scenario wherein the ToF sensor performs a no depth reading in case of a specular surface used in the processes of FIGS. 3-6, according to various embodiments. In one scenario, specular surface 801 may perform a mirror-like reflection of the ray of light, in which light from a single incoming direction is reflected into a single outgoing direction. The direction of an incoming light 803 (i.e., the incident ray), and the direction of outgoing light reflected 805 (i.e., the reflected ray) make the same angle with respect to the surface normal. In one example embodiment, when there is a specular surface, it reflects the light in a normal direction, the reflected ray is bounced away from the ToF sensor, and as a result a depth reading of the specular surface P is not available. In another scenario, the specular surface may reflect the light above the surface normal, and the reflected light goes into another direction. The pre-requisite for the ray of light hitting at the specular surface P to go back to the ToF sensor is the angle between the surface normal and the incident ray.

Figure 9:
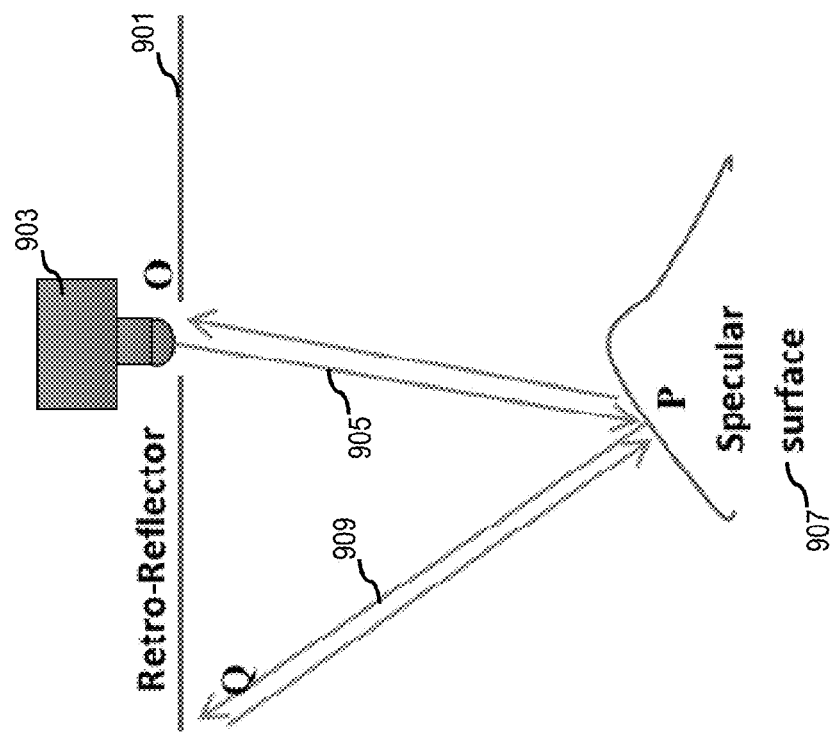
FIG. 9 represents a scenario wherein a retro-reflector is attached on the ToF sensors to reflect the light from specular surfaces back to the ToF sensors used in the processes of FIGS. 3-6, according to various embodiments.

FIG. 9 represents a scenario wherein a retro-reflector is attached on the ToF sensors to reflect the light from specular surfaces back to the ToF sensors, used in the processes of FIGS. 3-6, according to various embodiments. In one example embodiment, the retro-reflector reflects an oncoming beam of light back to its source, and a double depth reading of the total flight time (i.e., OP+PQ) is performed. In one scenario, the retro-reflector 901 is attached on the ToF sensor 903. Then, the ToF sensor may project an incident ray 905 on the specular surface 907. The specular surface 907 may reflect the light 909 in the other direction (PQ). At this point, the retro-reflector may reflect the reflected light 909 back to the specular surface 907. Then, the specular surface may reflect the lights back to the ToF sensor. In such manner the total flight time of OP+PQ is obtained.

The processes described herein for reconstructing dynamic arbitrary specular objects may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
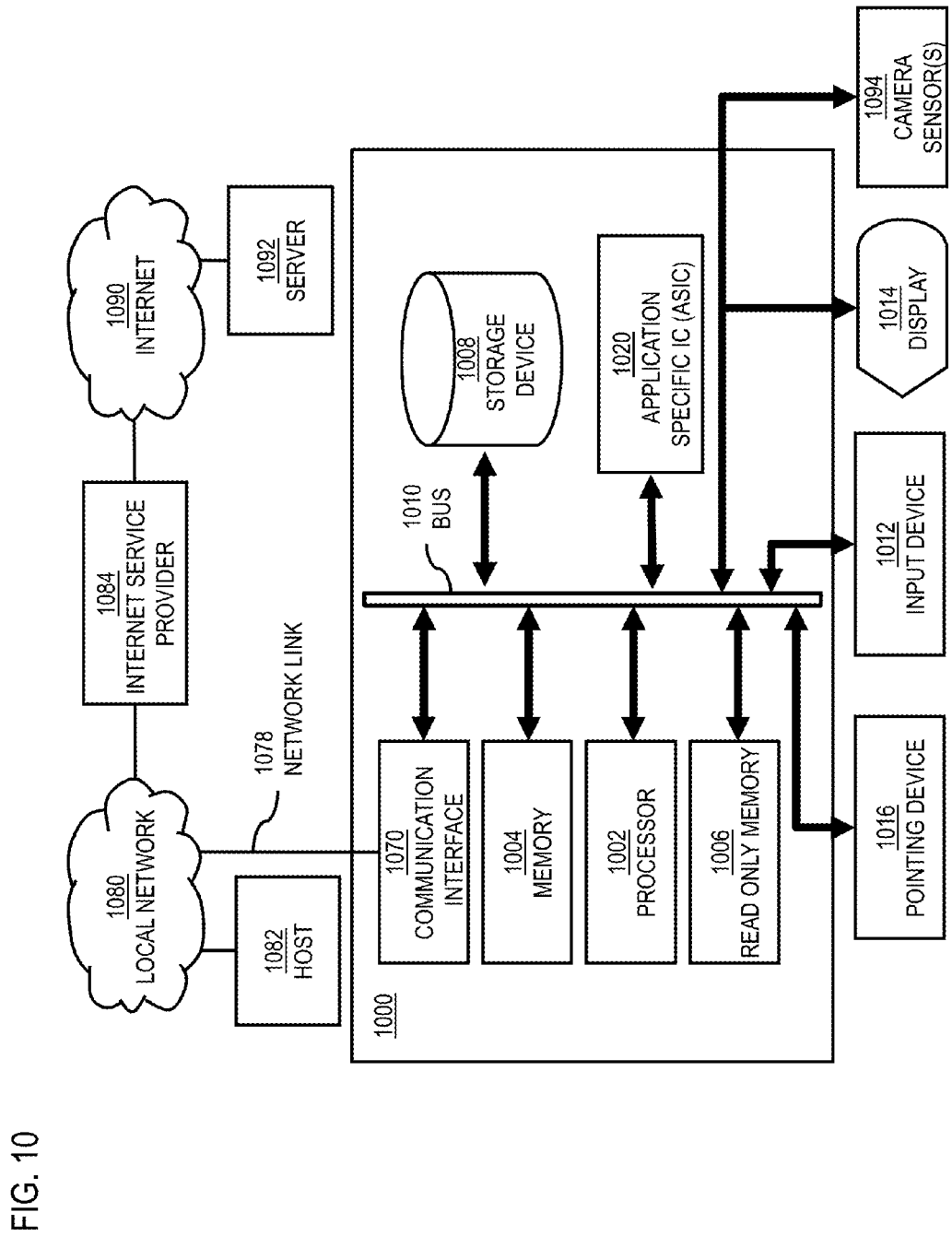
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to reconstruct dynamic arbitrary specular objects as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of reconstructing dynamic arbitrary specular objects.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to reconstruction of dynamic arbitrary specular objects. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for reconstructing dynamic arbitrary specular objects. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for reconstructing dynamic arbitrary specular objects, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for reconstructing dynamic arbitrary specular objects to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to reconstruct dynamic arbitrary specular objects as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of reconstructing dynamic arbitrary specular objects.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to reconstruct dynamic arbitrary specular objects. The memory 1105 also stores the data associated with or generated by the execution of the inventive steps.

Figure 12:
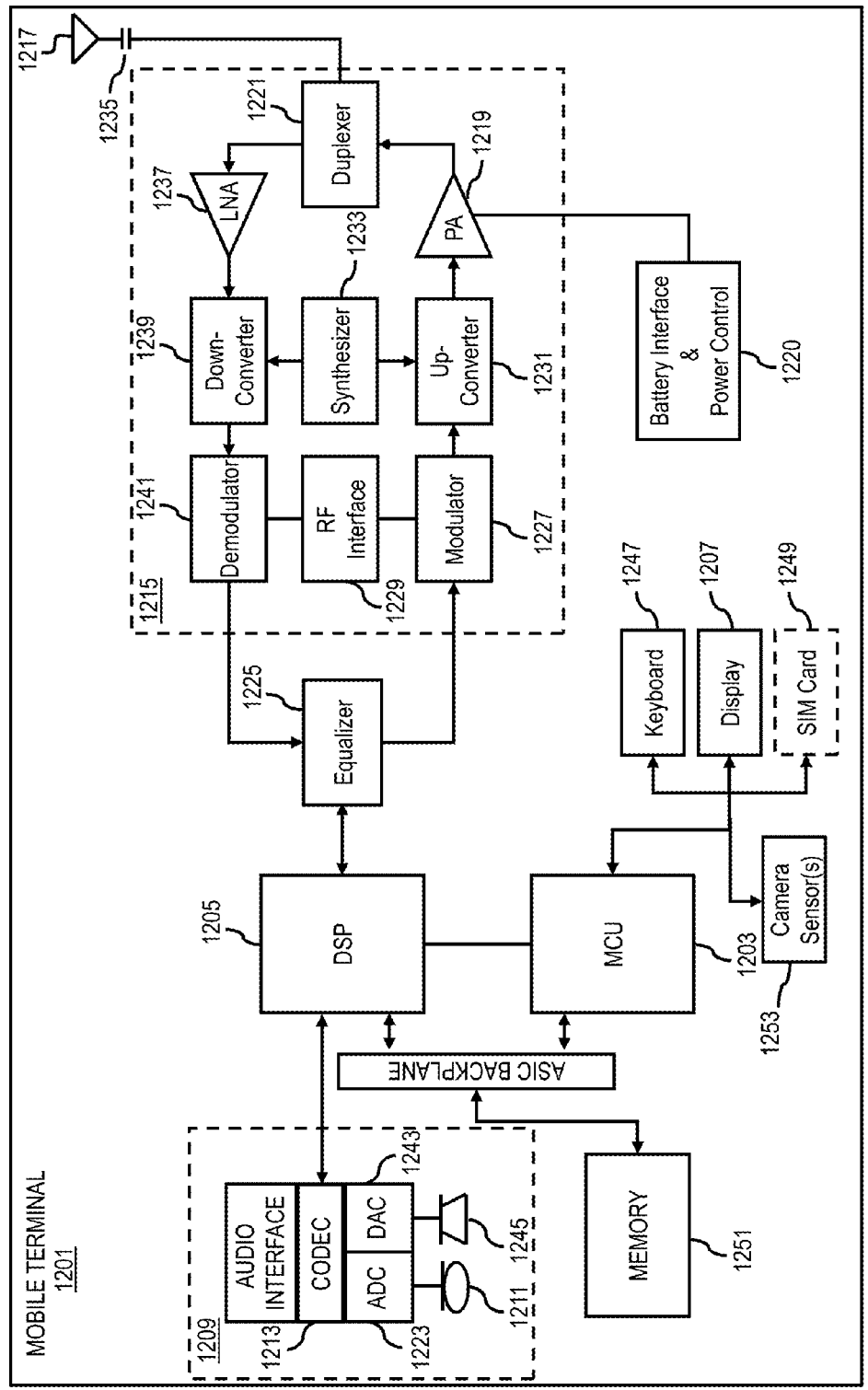
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of reconstructing dynamic arbitrary specular objects. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit.

A main display unit 1207 provides a display to the user in support of various applications and mobile terminal functions that perform or support the steps of reconstructing dynamic arbitrary specular objects. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to reconstruct dynamic arbitrary specular objects. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. The methods and systems (including steps and components thereof) can be mixed, matched, and/or rearranged. Additionally more, fewer, or different method steps or device/system components may be provided with less, more or different steps.

What is claimed is:

1. A method comprising:
    determining time-of-flight data for at least one pixel of at least one time-of-flight sensor configured with at least one retro-reflector, wherein the time-of-flight data includes a first distance from the at least one time-of-flight sensor to at least one point of at least one surface, and a second distance from the at least one point to the at least one retro-reflector;
    determining other time-of-flight data for one or more neighboring pixels which are neighboring the at least one pixel;
    determining at least one range distance to the at least one point of the at least one surface by causing, at least in part, a factoring out of the second distance from the time-of-flight data by using the other time-of-flight data; and
    causing, at least in part, a reconstruction of the at least one surface using the at least one range distance.

2. A method of claim 1, further comprising:
    causing, at least in part, a specification of a minimum number of the one or more neighboring pixels to process.

3. A method of claim 2, further comprising:
    determining that an available number of the one or more neighboring pixels is below the minimum number; and
    causing, at least in part, an initiation of the factoring out of the second distance based, at least in part, on the available number.

4. A method of claim 2, wherein the minimum number of the one or more neighboring pixels is at least four.

5. A method of claim 1, wherein the at least one retro-reflector is a planar surface, a semi-spherical surface, a parabolic surface, or a combination thereof.

6. A method of claim 1, further comprising:
    determining the time-of-flight data, the other time-of-flight data, or a combination thereof by causing, at least in part, an opening and a shutting of the at least one retro-reflector to capture a plurality of measurements; and
    determining that one or more objects have only diffuse surfaces, mixed diffuse and specular surfaces, only specular surfaces, or a combination thereof based, at least in part, on one or more differences among the plurality of measurements.

7. A method of claim 6, further comprising:
    determining the at least one range distance for the at least one point of the one or more objects that are associated with the at least one surface that includes the only diffuse surfaces using non-retro reflector based processes; and
    determining the at least one range distance for the at least one point of the one or more objects that are associated with the at least one specular surface that includes the mixed diffuse and specular surfaces, the only specular surfaces, or a combination thereof using retro reflector based processes comprising the factoring out of the second distance.

8. A method of claim 1, wherein the at least one surface is associated with at least one dynamic object, the method further comprising:
    causing, at least in part, a synchronization of the at least one time-of-flight sensor configured with the retro-reflector and at least one other time-of-flight sensor configured without the retro-reflector to cause, at least in part, a capturing of the time-of-flight data, the other time-of-flight data, or a combination thereof for the at least one dynamic object.

9. A method of claim 8, wherein the at least one time-of-flight sensor and the at least one other time-of-flight sensor are configured with differently modulated lasers.

10. A method of claim 1, further comprising:
    determining the at least one surface, one or more objects associated with the at least one surface, or a combination thereof extends beyond a field of view of the at least one time-of-flight sensor; and
    causing, at least in part, a movement of the at least one time-of-flight sensor to capture the time-of-flight data, the other time-of-flight data, or a combination thereof for the at least one surface, the one or more objects, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
        determine time-of-flight data for at least one pixel of at least one time-of-flight sensor configured with at least one retro-reflector, wherein the time-of-flight data includes a first distance from the at least one time-of-flight sensor to at least one point of at least one surface, and a second distance from the at least one point to the at least one retro-reflector;
        determine other time-of-flight data for one or more neighboring pixels which are neighboring the at least one pixel;
        determine at least one range distance to the at least one point of the at least one surface by causing, at least in part, a factoring out of the second distance from the time-of-flight data by using the other time-of-flight data; and
        cause, at least in part, a reconstruction of the at least one surface using the at least one range distance.

12. An apparatus of claim 11, wherein the apparatus is further caused to:
    cause, at least in part, a specification of a minimum number of the one or more neighboring pixels to process.

13. An apparatus of claim 12, wherein the apparatus is further caused to:
    determine that an available number of the one or more neighboring pixels is below the minimum number; and
    cause, at least in part, an initiation of the factoring out of the second distance based, at least in part, on the available number.

14. An apparatus of claim 12, wherein the minimum number of the one or more neighboring pixels is at least four.

15. An apparatus of claim 11, wherein the at least one retro-reflector is a planar surface, a semi-spherical surface, a parabolic surface, or a combination thereof.

16. An apparatus of claim 11, wherein the apparatus is further caused to:

determine the time-of-flight data, the other time-of-flight data, or a combination thereof by causing, at least in part, an opening and a shutting of the at least one retro-reflector to capture a plurality of measurements; and determine that one or more objects have only diffuse surfaces, mixed diffuse and specular surfaces, only specular surfaces, or a combination thereof based, at least in part, on one or more differences among the plurality of measurements.

17. An apparatus of claim 16, wherein the apparatus is further caused to:

determine the at least one range distance for the at least one point of the one or more objects that are associated with the at least one surface that includes the one only diffuse surfaces using non-retro reflector based processes; and determine the at least one range distance for that at least one point of the one or more objects that are associated with the at least one specular surface that includes the mixed diffuse and specular surfaces, the only specular surfaces, or a combination thereof using retro reflector based processes comprising the factoring out of the second distance.

18. A computer-readable storage medium carrying one or more sequences of one or more instructions which, when executed by one or more processors, cause an apparatus to at least perform the following steps:

determining time-of-flight data for at least one pixel of at least one time-of-flight sensor configured with at least one retro-reflector, wherein the time-of-flight data includes a first distance from the at least one time-of-flight sensor to at least one point of at least one surface, and a second distance from the at least one point to the at least one retro-reflector;

determining other time-of-flight data for one or more neighboring pixels which are neighboring the at least one pixel;

determining at least one range distance to the at least one point of the at least one surface by causing, at least in part, a factoring out of the second distance from the time-of-flight data by using the other time-of-flight data; and causing, at least in part, a reconstruction of the at least one surface using the at least one range distance.

19. A computer-readable storage medium of claim 18, wherein the apparatus is further caused to perform:

causing, at least in part, a specification of a minimum number of the one or more neighboring pixels to process.

20. A computer-readable storage medium of claim 19, wherein the apparatus is further caused to perform:

determining that an available number of the one or more neighboring pixels is below the minimum number; and causing, at least in part, an initiation of the factoring out of the second distance based, at least in part, on the available number.

* * * * *